United States Patent [19]

Norman et al.

[11] 3,948,809

[45] Apr. 6, 1976

[54] ABSORBENT AND THE PROCESS FOR PRODUCING IT

[75] Inventors: Joseph Rangott Norman, South Coogee; David Graham Wood, Sardinia, both of Australia

[73] Assignee: Unisearch Limited, Kensington, Australia

[22] Filed: Jan. 18, 1973

[21] Appl. No.: 324,578

[52] U.S. Cl. ............... 252/463; 423/244; 423/628
[51] Int. Cl.² ................................. B01J 21/04
[58] Field of Search ........... 252/463; 423/244, 628

[56] References Cited
UNITED STATES PATENTS

| | | | |
|---|---|---|---|
| 2,378,155 | 6/1945 | Newsome et al. | 423/628 |
| 2,992,884 | 7/1961 | Bienstock et al. | 252/476 X |
| 3,228,891 | 1/1966 | Duke | 252/463 X |
| 3,268,295 | 8/1966 | Armbrust et al. | 252/463 X |
| 3,551,093 | 12/1970 | Myers et al. | 252/463 X |
| 3,557,025 | 1/1971 | Emerson et al. | 252/463 |

*Primary Examiner*—W. J. Shine
*Attorney, Agent, or Firm*—Emory L. Groff, Jr.

[57] ABSTRACT

This invention relates to absorbents which are particularly useful for the treatment of sulphur-containing oxides. These absorbents are made from materials containing aluminium oxide by steps including leaching an oxide-containing material, such as bauxite, with an alkaline solution; separating the resultant leach liquor; and drying the liquor. If desired alkali metal carbonate may be added to the liquor between the steps of separation and drying.

6 Claims, No Drawings

ABSORBENT AND THE PROCESS FOR PRODUCING IT

This invention relates to absorbent materials, and has principally (but not exclusively) been devised for the (absorption) treatment of sulphur-containing oxides. By virtue of the invention there is disclosed an absorbent which — while equally as efficient as existing absorbents in its reaction with, say, industrially produced sulphur oxides — possesses the marked advantage that it can be produced far more economically than such existing absorbents.

In view of its especial applicability in treating sulphur oxides, the material of the invention will principally, in the subsequent description, be discussed and described in relation thereto. However it is to be understood that, when employed in any appropriate environment — such as in product-recovery and fluid stream-purification operations — the material is equally efficacious.

The removal of sulphur oxides from gases (e.g. flue gases produced in thermal power generation or gases resulting from the roasting of pyrites) by reaction with a particular aluminium-containing compound is known. In this instance, the absorbent is prepared by reacting purified aluminium sulphate with sodium carbonate, and thereafter activating the resulting precipitate with hydrogen at an elevated temperature. While the thus produced absorbent is efficient in operation, it does have the disadvantage that its cost of production leaves much to be desired.

It is among the objects of the invention to provide a process for producing an absorbent and an absorbent so produced, whereby the above disadvantage is overcome, or at least considerably alleviated. To this end therefore the invention, in one broad aspect, provides a process for producing an absorbent (for, inter alia, sulphur oxides) from materials containing aluminium oxide, such process comprising the steps of leaching such a material — e.g. naturally occurring bauxite — with an alkaline solution; separating the resultant leach liquor from the undissolved material and, if desired, adding thereto a pre-determined amount of alkali metal carbonate; and thereafter drying the liquor so as to produce the absorbent in solid form. The invention also includes within its ambit an absorbent product made from the said aluminium oxide containing material, and a method of absorption utilising such product.

The invention will now be sequentially described (i) in general terms with reference to preferred details; and (ii) in specific terms with reference to precise numerical examples. However, it is to be understood that such details are merely illustrative of the invention — and therefore are not to be construed in any limiting sense.

As foreshadowed above, the preferred aluminium oxide-containing material is naturally occurring bauxite. This material may initially be in a nodule form — in which case it may be ground to reduce the leaching time. For complete reaction with the aluminium-oxide contained in the bauxite, it may be desirable to use alkali slightly in excess of the stoichiometric quantity.

The alkaline solution is preferably sodium hydroxide, since use of this material results in an eminently satisfactory leaching liquor — in addition to which, the resulting product is more reactive than those produced in using other alkaline solutions. While the leaching operation is best performed at atmospheric pressure and moderate temperatures in the range 50° to 100°C, higher temperatures can be used with appropriate increase in the attendant pressure. Drying of the liquor (to produce the absorbent in solid form) is usually effected by evaporation followed by calcination.

As a prelude to drying of the liquor, it has also been found (again as foreshadowed above) that the overall effectiveness of the process can be maximised by adding an alkali metal carbonate to the separated leach liquor; specifically, the incorporation (by dissolution in the leach liquor) of up to 30% by weight of the said alkali metal carbonate — such weight being based on the original (alkali) treating solution — has produced eminently satisfactory results. Although this addition is by no means essential for the satisfactory production of a suitable absorbent (for, inter alia, sulphur oxides), it is certainly preferred as the reactivity of the resultant absorbent material is improved by the carbonate addition.

Evaporation and calcination may be carried out in any suitable commercial apparatus — although the final conversion from solution state to solid state is most efficiently effected in a spray drier. A temperature of at least 400°C is generally desirable for calcination, the range 400° to 900°C — and, therewithin, the more specific range 600° to 700°C — being preferred.

A material so produced tends to be hygroscopic on prolonged exposure to humid atmospheres at ambient temperatures. Accordingly, after calcination, in apparatus such as a fluidised bed or a rotating kiln, the product is invariably stored in a moisture free atmosphere.

The invention will now be further described with reference to the following precise numerical examples.

EXAMPLE 1

One hundred grams of finely ground bauxite containing approximately 55% by weight of aluminium oxide ($Al_2O_3$) was leached for 5 hours in a solution made up from 43 grams of sodium hydroxide (NaOH) in 200 grams of water and maintained at 95°C.

After separation of the undissolved material (gangue) by filtration, the resulting solution is evaporated to relative dryness in an oven at 140°C. The partly dried material was then heated for 1 hour in a muffle furnace at 650°C.

The resultant product is a hard porous material which — from the point of view of its manner of manufacture — has been produced both economically and efficaciously. The efficiency of such material as an absorbent will be discussed herebelow.

EXAMPLE 2

To the filtrate, produced as in Example 1, was added a solution containing 8 grams of sodium carbonate. The resulting mixture was dried and calcined as in Example 1. Again, the product was a hard porous material, the absorbtive ability of which is elaborated upon hereafter.

EXAMPLE 3

The procedure of Example 1 is generally followed. However, in this case, the 43 grams of sodium hydroxide are replaced by 60 grams of potassium hydroxide.

EXAMPLE 4

To the filtrate, produced as in Example 3, is added a solution containing 10.5 grams of potassium carbonate.

The resulting mixture is dried and calcined as in Example 1.

EXAMPLE 5

In this example, the procedure of Example 1 is followed — except that, in the initial leaching step, the sodium hydroxide is replaced by a stoichiometrically proportioned mixture of sodium hydroxide and potassium hydroxide.

EXAMPLE 6

In this example, the procedure of Example 2 is followed — except that, as an additive to the filtrate, the sodium carbonate is replaced by a stoichiometrically proportioned mixture of sodium carbonate and potassium carbonate.

Turning now to the "method of absorption" aspect of the invention the preferred procedure is as follows:

A product manufactured in accordance with the invention is crushed, sieved into uniformly sized pellets, and reacted — at 340°C in a thermobalance — with a mixture of sulphur dioxide and air. When compared with similarly-quantitied samples of the product manufactured in accordance with the previously discussed comparatively expensive prior art procedures (i.e. a product prepared from pure aluminium sulphate and sodium carbonate with activation of the product in a hydrogen atmosphere at 650°C for 24 hours), the product of the present invention demonstrates a level of performance which, reactivity-wise, is equally satisfactory.

In exemplary testimony to the foregoing, a product manufactured by reacting purified aluminum sulfate with sodium carbonate and thereafter activating the resulting precipitate with hydrogen at an elevated temperature was compared with a product produced in accordance with one of the above-described examples of the invention (specifically, the product of Example 2), the comparison criteria being (i) overall production costs, and (ii) efficiency as an absorbent. Cost-wise the product of the present invention was found to effect a reduction of the order of 75%; as an absorbent, the following Table — wherein the absorption of sulphur dioxide was measured at predetermined intervals — shows that the instant product loses nothing by comparison with its expensive predecessor.

TABLE

| Time in Minutes | Gms of SO$_2$ absorbed per gm of absorbent | |
| --- | --- | --- |
| | Prior art product | Product of the invention |
| 2 | .030 | .035 |
| 4 | .060 | .060 |
| 6 | .082 | .081 |
| 8 | .096 | .095 |
| 10 | .110 | .110 |

In the absorption reaction, the path taken is first, oxidation of the sulphur dioxide to the trioxide, followed by reaction whereby a complex sulphate is formed. The latter can be readily treated to regenerate re-usable absorbent starting material (with the production of elemental sulphur) — which factor contributes to the economic functioning of the overall absorption operation.

In conclusion it is reiterated that the foregoing process, as described in detail, can be varied without departing from the spirit and scope of the invention. For instance, while bauxite has been mentioned as the preferred aluminium oxide containing material, the invention is not confined thereto, any source of aluminium oxide — such as the red mud waste product from aluminium plants — being usable. As long as the basic criteria as initially defined are observed, such matters can be adjusted in accordance with prevailing environmental conditions.

We claim:
1. A process for producing an absorbent, capable of absorbing sulphur-containing oxides from industrial gases, from materials containing aluminum oxide consisting essentially of naturally occurring bauxite or red mud waste product from aluminum plants comprising the steps of leaching said material with an alkaline solution; separating the resultant leach liquor from the undissolved material; adding up to about 30% by weight of an alkali metal carbonate to the separated leach liquor, said weight being based on the weight of the original alkaline solution; drying the liquor so as to produce the absorbent in solid form; and calcining said absorbent.
2. A process as claimed in claim 1 wherein the alkali metal carbonate is, sodium carbonate.
3. A process as claimed in claim 1 wherein the alkaline solution is a solution of sodium hydroxide.
4. A process as claimed in claim 1 wherein the leaching is carried out at atmospheric pressure at a temperature within the range 50° to 100°C.
5. A process as claimed in claim 1 wherein the calcination is performed at a temperature within the range 600° to 700°C.
6. An absorbent product produced in accordance with claim 1.

* * * * *